United States Patent [19]

Heckl et al.

[11] Patent Number: 4,508,623
[45] Date of Patent: Apr. 2, 1985

[54] SNAP-TOGETHER FILTER-PLATE ASSEMBLY

[75] Inventors: Franz Heckl, Senden; Herbert Herget, Staig-Steinberg, both of Fed. Rep. of Germany

[73] Assignee: Lenser Verwaltungs-GmbH, Senden, Fed. Rep. of Germany

[21] Appl. No.: 499,378

[22] Filed: May 31, 1983

[30] Foreign Application Priority Data

May 29, 1982 [DE] Fed. Rep. of Germany ....... 3220487

[51] Int. Cl.³ .............................................. B01D 25/12
[52] U.S. Cl. ..................................... 220/229; 210/231
[58] Field of Search ............... 210/224, 227, 228, 229, 210/230, 231, 232, 450; 285/351, 423, DIG. 22; 29/453; 220/354, 355, 356, 378, 358

[56] References Cited

U.S. PATENT DOCUMENTS

| 3,068,939 | 12/1962 | Commisso | 29/453 |
| 3,656,622 | 4/1972 | Heimbach et al. | 210/231 |
| 3,888,769 | 6/1975 | Schotten et al. | 210/231 |
| 3,931,014 | 1/1976 | Heimbach et al. | 210/231 |
| 4,166,035 | 8/1979 | Ramsteck | 210/231 |

FOREIGN PATENT DOCUMENTS

| 2920064 | 11/1980 | Fed. Rep. of Germany | 210/231 |
| 1279424 | 11/1961 | France | 285/DIG. 22 |
| 753641 | 7/1956 | United Kingdom | 220/378 |
| 1134025 | 11/1968 | United Kingdom | 210/231 |
| 2069360 | 8/1981 | United Kingdom | 210/231 |

Primary Examiner—John Adee
Attorney, Agent, or Firm—Karl F. Ross; Herbert Dubno

[57] ABSTRACT

A filter-press plate assembly has a substantially rigid support plate having a face formed of a central region and an outer periphery bounding the region, a substantially rigid annular frame having an annular face at least closely confronting the support-plate face at the periphery, and a generally planar and elastically deformable central filter panel formed integrally with the frame and engageable with the central region within the periphery. The filter panel forms a pressurizable chamber with the support plate so that pressurization of the chamber can press a filter cloth lying on the filter panel toward another such filter cloth of an adjacent such assembly. An annular groove formed at the outer periphery in one of the faces is open toward the other face and an annular ridge formed on and projecting from the other face fits in this groove. Respective seal rings are recessed in the plate and frame and project oppositely therefrom at the outer periphery. The plate-face seal ring engages the frame face and the frame-face seal ring engages the plate face at the outer periphery. To hold the support plate and frame together the ridge is of increasing thickness away from the one face and measured parallel thereto and the groove is generally complementarily formed, so that the frame and plate snap together.

11 Claims, 2 Drawing Figures

SNAP-TOGETHER FILTER-PLATE ASSEMBLY

FIELD OF THE INVENTION

The present invention relates to a filter-plate assembly. More particularly this invention concerns such an assembly usable in a filter press.

BACKGROUND OF THE INVENTION

A standard filter press, such as described in U.S. Pat. Nos. 3,926,811 and 4,166,035, has a plurality of plate assemblies each constituted by a rigid support plate and a rigid frame lying on the support plate and integrally formed with a flexible central region forming a filter panel. A filter cloth overlies the frame and is supported at the central region on bumps formed on the panel. At least two such plate assemblies are joined together with the filter cloths against each other and forming a common intake chamber, each filter cloth forming with the respective panel an output chamber, and each panel forming with the respective support plate a closed dewatering chamber. Normally a filter press comprises a whole stack of such assemblies with each support plate except for the end support plates serving two assemblies and bounding two dewatering chambers.

During normal use the dewatering chamber is empty so that each panel lies against the central region of the respective support plate. A solution to be filtered is introduced into the intake compartment between the two cloths and the filtrate is aspirated from the output chamber between each cloth and the respective filter panel.

When the filter cake that builds up on the cloths becomes too thick, input of solution into the intake compartments is stopped and the dewatering compartments are filled, normally with a clean fluid compatible with the filtrate. Meanwhile the output pump continues to draw liquid out of the output compartments. This action presses the two panels very tightly together so that the two filter cakes formed on them are united at the center, pressed, and dewatered into an easily removed bulk solid.

It is necessary to disassemble such a press to replace the filter cloths and clean the knobby faces of the filter panels at regular intervals. Since clean liquid only is fed to the pressure chambers, and only occasionally, it is standard to permanently fix together the support plate and frame. This minimizes handling during disassembly and reassembly. Unfortunately the press panel is virtually the only part of such an assembly which ever fails. This means that the entire assembly must be discarded whenever a press panel wears out, something particularly wasteful when two frames and press panels are bonded to a single support plate.

OBJECTS OF THE INVENTION

It is therefore an object of the present invention to provide an improved filter-plate assembly for a filter press.

Another object is the provision of such a filter-plate assembly for a filter press which overcomes the above-given disadvantages, that is which is relatively simple to divide into several parts while at the same time working as well as the prior-art assemblies with unitary support plate, frame, and web.

SUMMARY OF THE INVENTION

These objects are attained according to the instant invention in a filter-press plate assembly having a substantially rigid support plate having a face formed of a central region and an outer periphery bounding the region, a substantially rigid annular frame having an annular face at least closely confronting the support-plate face at the periphery, and a generally planar and elastically deformable central filter panel formed integrally with the frame and engageable with the central region within the periphery. The filter panel forms a pressurizable chamber with the support plate so that pressurization of the chamber can press a filter cloth lying on the filter panel toward another such filter cloth of an adjacent such assembly. An annular groove formed at the outer periphery in one of the faces is open toward the other face and an annular ridge formed on and projecting from the other face fits in this groove. Respective seal rings are recessed in the plate and frame and project oppositely therefrom at the outer periphery. The plate-face seal ring engages the frame face and the frame-face seal ring engages the plate face at the outer periphery.

This arrangement therefore locks the support plate and frame solidly together against relative shifting, while providing an excellent seal between them. In fact the support plate and frame according to this invention form a solid and easily handled unit which nonetheless can be broken down if necessary to replace any of its parts. As a result during routine filter-cloth replacement the system of this invention is as convenient to disassemble and work on as the prior-art systems, yet the frame and web can be separated from the support plate if need be for economical individual replacement.

To hold the support plate and frame together according to this invention, the ridge is of increasing thickness away from the one face and measured parallel thereto and the groove is generally complementarily formed, so that the frame and plate snap together. In addition the seals, groove, and ridge extend substantially parallel to each other peripherally around the respective faces.

In substantially uncompressed condition the seals project from the faces of the plate and frame. Thus the seals are compressed when the plate and frame faces are engaged with each other.

The ridge according to this invention has planar outer ends parallel to the respective faces and spaced therefrom by a predetermined distance and the respective groove has a complementary flat floor spaced from the respective faces at least by the same distance. Thus the ridges will not bottom in the grooves when the plate assembly is pressed together when the press is reassembled, insuring that the seal rings will work well. When as described below a ridge is provided at the extreme outer edge, it is shorter than the other ridge to prevent fouling of the outside of the assembly from preventing it from fitting properly together. In addition this outer-edge ridge protects the space between the frame and support plate to keep foreign matter therefrom.

According to this invention the one face is formed with two such ridges and the other face with two such grooves. In addition the two ridges flank the respective seal ring so that same engages the other face at the respective groove. Such an arrangement seals very tightly.

One of the grooves according to the invention is formed at the extreme outer edge of the respective face and opens both parallel and perpendicular to the respective face. The respective ridge is formed at the extreme outer edge of the respective face.

In accordance with another feature of this invention the faces are formed with grooves and the seal rings are recessed in same and project outward therefrom above the respective faces. In addition the ridge is formed on the frame so that sufficient cross section is left for the filtrate-aspiration passage. For snapping-together of the frame and plate the ridge is of generally trapezoidal section.

DESCRIPTION OF THE DRAWING

The above and other features and advantages will become more readily apparent from the following, reference being made to the accompanying drawing in which.

SPECIFIC DESCRIPTION

Figure 1:
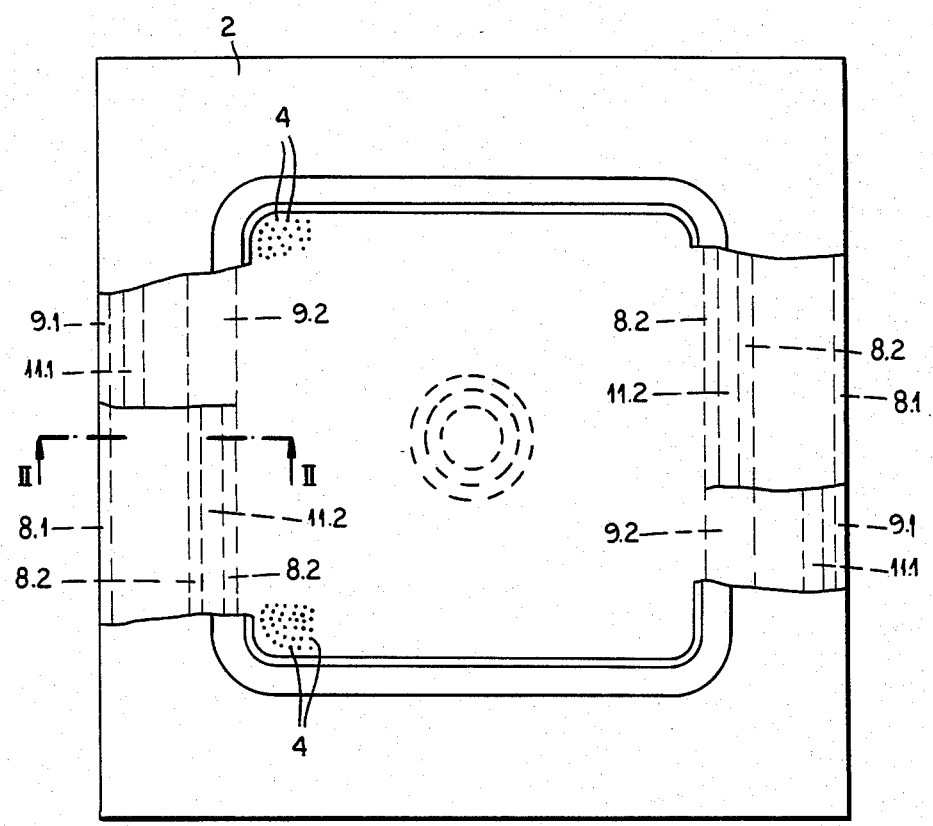
FIG. 1 is a front view of a partly broken away filter plate according to this invention.
Figure 2:
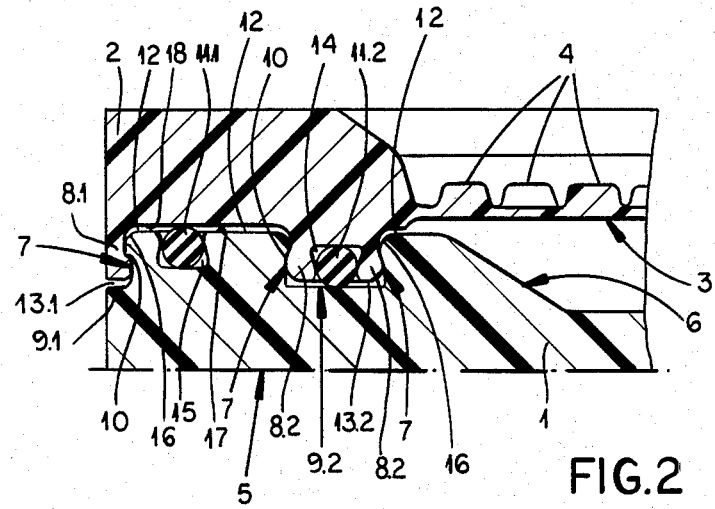
FIG. 2 is a large-scale section taken along line II—II of FIG. 1.

As seen in FIGS. 1 and 2 a filter-plate assembly according to this invention basically comprises a rigid, normally synthetic-resin, press plate 1, a separate and similar rigid frame 2, and a flexible filter panel 3 unitary with the frame 2 and formed on its outer face with bumps 4 on which lies a filter cloth as described in the above-cited patents. The press plate 1 has a peripheral portion 5 and a recessed central region 6 bounded by it. The peripheral portion 5 defines a face 17 that is directly confronted by a face 18 of the frame 2.

As is known two such assemblies at least are used together, with the bumps 4 pointing at each other and the filter cloths forming an intake compartment. Each support plate is also symmetrical about the plane indicated at the dot-dash line across the bottom of FIG. 2 so it serves as the back of two adjacent dewatering chambers. A suspension to be filtered is fed to this intake compartment and filtrate is withdrawn from between the cloths and the panel 3, so that the solids will form a cake on the cloth. The chamber between the inside, lower in FIG. 2, face of the panel 3 and the region 6 can be pressurized to press the panels 3 together and thereby dewater the filter cake, also as described in the above-mentioned patents.

The plate 1 is secured to the frame 2 and panel 3 by a coupling 7 basically comprised as outer and inner ridges 8.1 and 8.2 formed on the face 18 and generally complementary grooves 9.1 and 9.2 formed on the face 17. The plate 1 and frame 2 are furthermore formed with grooves 14 and 15 receiving respective O-rings 11.2 and 11.1 that engage the faces 17 and 18. The ridges and grooves 8.1–9.2 are formed with angled sides 10, giving them a trapezoidal section, and the outer edge of the face 17 is chamfered at 16 to facilitate snapping together of the two parts.

The rings 11.1 and 11.2 are of a diameter greater than the depth perpendicular to the faces 17 and 18 of the respective grooves 15 and 14, so that in uncompressed condition they project slightly beyond the respective faces. The groove 14 is actually formed in the ridge 8.2 so that the seal 11.2 is carried by this part. This leaves the full cross section of the frame 2 available for the aspiration passage, as the feed passage through the plate 1 for the dewatering compartment can be quite small. In addition the ridges 8.1 and 8.2 are slightly shorter than the respective grooves 9.1 and 9.2 so that in the illustrated position the spacings 13.1 and 13.2 formed between the tops of the ridges 8.1 and 8.2 and the floors of the respective grooves 9.1 and 9.2 are somewhat greater than the spacing 12 formed between the faces 17 and 18 between these grooves. In addition the spacing 13.1 is greater than the spacing 13.2, which prevents any fouling of this outermost crack from preventing the two elements 1 and 2 from being pushed all the way together. In use the entire assembly is tightly clamped so that the spacing 12 is reduced to zero, thereby compressing the rings 11.1 and 11.2 and making an effective seal.

With this system it is therefore possible to assemble the plate assembly simply by snapping the two elements 1 and 2 together. They will hold together once thus joined, so that interposition of the filter cloths and stacking of a plurality of such assemblies can take place simply and rationally. The beveled edges 16 center the two parts 1 and 2. Similarly the trapezoidal section of the grooves 14 and 15 holds the seal rings 11.2 and 11.2 in place even when the assembly is opened up.

We claim:

1. A filter-plate assembly for a filter press, the assembly comprising:
    a substantially rigid support plate having a plate face formed of a central region and an outer periphery bounding the region;
    a substantially rigid annular frame having an annular frame face at least closely confronting the plate face at the periphery;
    a generally planar and elastically deformable central filter panel formed integrally with the frame and forming with the central region and within the periphery a pressurizable chamber, whereby pressurization of the chamber can press a filter cloth lying on the filter panel toward another such filter cloth of an adjacent such assembly;
    an annular groove formed at the outer periphery in one of the faces, of increasing width away from the one face, having a flat floor spaced from the other face, and open toward the other face;
    an annular ridge formed on and projecting from the other face, having a planar outer end parallel to the one face, and of increasing thickness away from the other face so as to be snap-fittable in the groove; and
    respective annular plate and frame seals recessed in the plate and frame and projecting oppositely therefrom at the outer periphery, the plate seal engaging the frame face and the frame seal engaging the plate face, the seals projecting in uncompressed condition from the faces of the plate and frame, whereby the seals are compressed when the plate and frame faces are engaged with each other.

2. The filter-plate assembly defined in claim 1 wherein the seals, groove, and ridge extend substantially parallel to each other annularly around the respective faces.

3. The filter-plate assembly defined in claim 2 wherein in substantially uncompressed condition the seals project from the faces of the plate and frame, whereby the seals are compressed when the plate and frame faces are engaged with each other.

4. The filter-plate assembly defined in claim 3 wherein the outer end is spaced from the one face by a predetermined distance and the flat floor is spaced from the other face at least by the same distance.

5. The filter-plate assembly defined in claim 1 wherein the one face is formed with two such ridges and the other face with two such grooves.

6. The filter-plate assembly defined in claim 5 wherein the two ridges flank seal ring of the other face, whereby same engages the other face at the respective groove.

7. The filter-plate assembly defined in claim 5 wherein one of the grooves is formed at the extreme outer edge of the respective face and opens parallel and perpendicular to the respective face, the respective ridge being formed at the extreme outer edge of the respective face.

8. The filter-plate assembly defined in claim 7 wherein the ridges have planar outer ends parallel to the one face and spaced therefrom by a predetermined distance and the respective groove has a complementary flat floor spaced from the other face at least by the same distance, the ridge at the extreme outer edge being shorter than the other ridge.

9. The filter-plate assembly defined in claim 1 wherein the faces are formed with grooves and the seal rings are recessed in same and project outward therefrom above the respective faces.

10. The filter-plate assembly defined in claim 1 wherein the ridge is formed on the frame.

11. The filter-plate assembly defined in claim 1 wherein the ridge is of generally trapezoidal section.

* * * * *